(No Model.)
H. NOLEN.
DUMPING WAGON.
No. 325,185. Patented Aug. 25, 1885.
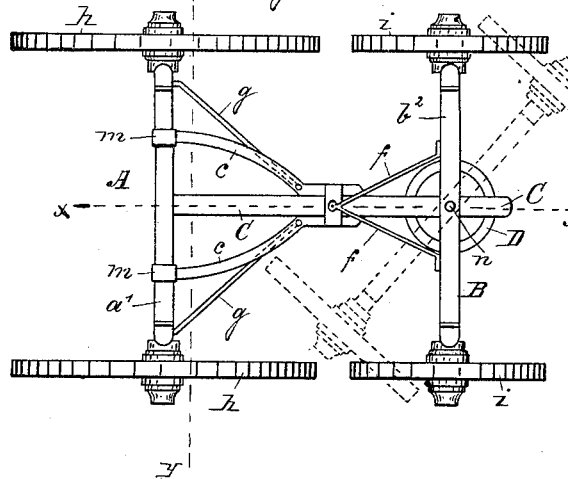
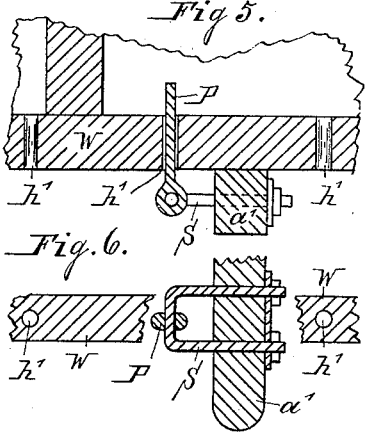
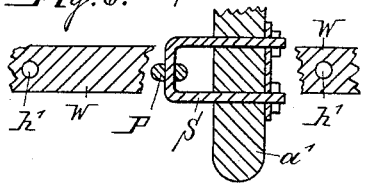
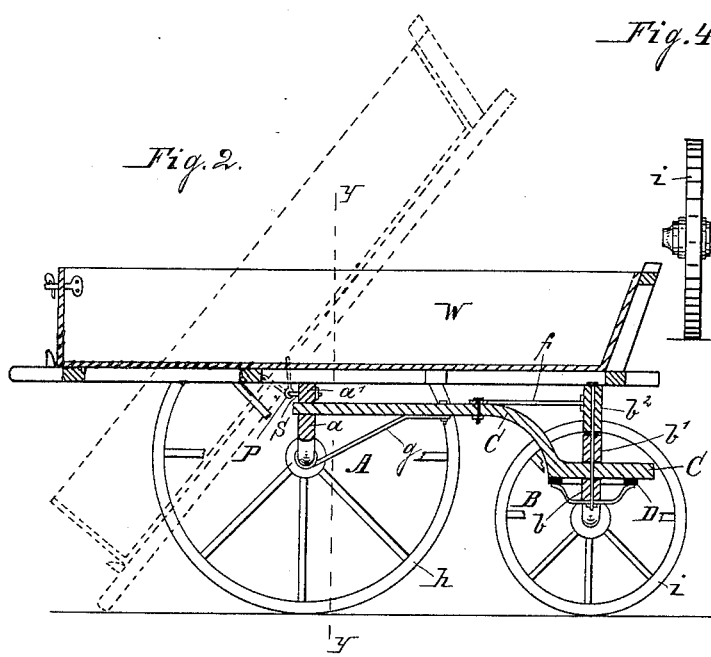
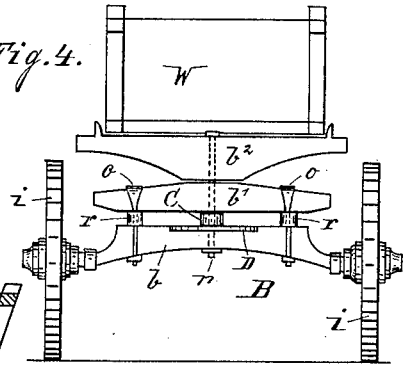
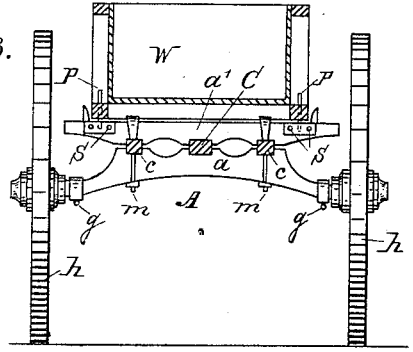
WITNESSES:
Theodore Langbein.
Gottf. Koehler.
INVENTOR:
Henry Nolen,
Per
James B. Lizius & Co,
Attorneys.

UNITED STATES PATENT OFFICE.

HENRY NOLEN, OF INDIANAPOLIS, INDIANA, ASSIGNOR TO JOHN GUED-ELHOEFER, OF SAME PLACE.

DUMPING-WAGON.

SPECIFICATION forming part of Letters Patent No. 325,185, dated August 25, 1885.

Application filed July 13, 1885. (No model.)

*To all whom it may concern:*

Be it known that I, HENRY NOLEN, a citizen of the United States, residing at Indianapolis, in the county of Marion and State of Indiana, have invented certain new and useful Improvements in Dumping-Wagons, of which the following is a specification.

My invention relates to improvements in four-wheeled dumping-vehicles, such as are used to transport and deliver coal, sand, lime, &c.; and the objects of my improvements are to provide a four-wheeled dumping-wagon which will turn in the least possible space, one of the fore wheels passing entirely under the wagon-bed, and the hind wheel next to it turning around its vertical axis without moving from its position, and the wagon-bed of which can be easily detached, and the construction of which is more simple, strong, and cheap than in the wagons now in use. I attain these objects by the mechanism illustrated in the accompanying drawings, in which—

Figure 1 is a top view of the running-gear of my four-wheeled dumping-wagon; Fig. 2, a longitudinal vertical section through the same and the wagon-bed; Fig. 3, a vertical cross-section on line $y\,y$ on Figs. 1 and 2; Fig. 4, a front view of the wagon, and Figs. 5 and 6 vertical and horizontal detail sections showing the device used for securing the wagon-bed to the running gear.

Similar letters refer to similar parts throughout the several views.

A is the hind gear of the wagon, consisting of the large wheels $h\,h$, the axle $a$, and the bolster $a'$; B, the fore gear of the wagon, consisting of the small wheels $i\,i$, the axle $b$, the bolster-support $b'$, rigidly connected to the axle $b$, and the bolster proper, $b^2$.

C is the coupling-pole, connecting the fore gear B to the hind gear A. This coupling-pole C rests with its rear end between the axle $a$ and the bolster $a'$, and extends forward horizontally to a point where it cannot interfere any more with the fore wheels $i\,i$ when the same turn under the wagon-bed. From there the pole C is bent down, assuming a horizontal continuation again where it has to pass between the axle $b$ and the bolster-support $b'$. To the axle $b$, the bolster-support $b'$, and the bolster $b^2$ the coupling-pole is secured by the king-bolt $u$. The bolster-support $b'$ being supported onto and separated from the axle $b$ by the blocks $r\,r$, of a greater thickness than the fore end of the coupling-pole C, allows the fore gear B to turn while the pole C retains its position, the iron circular plate D, secured to the axle $b$, with the king-bolt $u$ as center, forming an anti-friction track for the fore end of the coupling-pole.

$c\,c$ are the hind hounds, bolted to the coupling-pole C near the middle, between the hind and fore gear, and secured to the axle $a$ and the bolster $a'$ by the stirrups $m\,m$, strapped around the bolster and axle and passing through the hounds $c\,c$.

$g\,g$ are braces from near the ends of the axle $a$ onto the under side of the coupling-pole C and the hounds $c\,c$. The wagon-bed W rests horizontally on the bolsters $a'$ and $b^2$, the bolster $b^2$ being brought up to a level with the hind bolster $a'$ by the intermediate bolster-support, $b'$, that rests by means of the blocks $r\,r$ on the fore axle $b$, and is rigidly secured to the same by the stirrups $o\,o$.

$f\,f$ are iron braces secured to the coupling-pole C where it connects with the hounds $c\,c$, and extending forward onto the bolster $b^2$ each side of the king-bolt $u$, thus holding the bolster of the fore gear rigidly in place with the bolster of the hind gear and with the coupling-pole C. The relative height of the wheels of the hind and fore gear and the bend in the coupling-pole have to be so that the fore wheels can pass under the wagon-bed without interfering with the coupling-pole. The wagon-bed W rests on the bolsters $a'$ and $b^2$, and is kept in place by the following device: A clevis S is bolted to the bolster $a'$ of the hind gear at each side of the coupling-pole C, right under the longitudinal sills of the wagon-bed W. Eyebolts P are securely fastened by said clevises S to the bolster $a'$. These bolts P are inserted from below through vertical holes $h'\,h'$ in the sills of the wagon-bed W. The eyebolts and clevises form a hinge-connection between the wagon-bed and the bolster, thus allowing the rear end of the wagon-bed to tip and dump, as shown by dotted lines on Fig. 2.

By having a series of holes, $h'\,h'$, in the wagon-bed sills I am enabled to place and hold the wagon-bed on the bolsters with whatever amount of the load is desired to rest directly on the running-gear.

I am aware that platform-wagons have been constructed so that the fore wheels could turn under the platform; but what I claim as my invention is the particular construction of a four-wheeled dumping-wagon, as illustrated in the accompanying drawings, which will produce a wagon that easily turns in a small space and is more substantial and cheaper than the ones now in use.

What I claim, and desire to secure by Letters Patent, is—

1. In a four-wheeled dumping-wagon, the combination, with the wagon-bed W, the hind gear $h\ h\ a\ a'$, the hounds $c\ c$, and the fore gear $i\ i\ b\ b'\ b^2\ r\ r$, all constructed and arranged as described, of the coupling-pole C, extending from the hind gear forward horizontally and bending down into the fore gear, as described, the hind braces $g\ g$ and the fore braces $f\ f$ strengthening and bracing the coupling-pole C onto the hind axle and the fore bolster, substantially constructed as described, and for the purpose specified.

2. In a four-wheeled dumping-wagon, the combination, with the wagon-bed W, the running-gear A and B, as described, and the hind bolster $a'$, of the clevises S S, bolted to the bolster $a'$ under the longitudinal sills of the wagon-bed W, the eyebolts P P, hinged with their eyes to the clevises S S, and a series of vertical holes, $h'\ h'$, cut through the longitudinal sills of the wagon-bed W to receive the bolts P P and to form with them a detachable hinge-connection between the wagon-bed and the hind bolster, all constructed as described, and for the purpose specified.

In testimony whereof I have signed my name to this specification in the presence of two subscribing witnesses.

HENRY NOLEN.

Witnesses:
 JOHN GUEDELHOEFER,
 THEODORE LANGBEIN.